ADJUSTABLE MULTI-NEEDLE TONE ARM FOR PHONOGRAPH RECORDS

Filed Sept. 18, 1963 3 Sheets-Sheet 1

INVENTOR.
DOROTHEA M. WEITZNER
BY Polachek & Saulsbury
ATTORNEYS

April 12, 1966 D. M. WEITZNER 3,245,690

ADJUSTABLE MULTI-NEEDLE TONE ARM FOR PHONOGRAPH RECORDS

Filed Sept. 18, 1963 3 Sheets-Sheet 2

INVENTOR.
DOROTHEA M. WEITZNER
BY Polachek & Saulsbury
ATTORNEYS

April 12, 1966 D. M. WEITZNER 3,245,690

ADJUSTABLE MULTI-NEEDLE TONE ARM FOR PHONOGRAPH RECORDS

Filed Sept. 18, 1963 3 Sheets-Sheet 3

INVENTOR.
DOROTHEA M. WEITZNER

BY Polachek & Saulsbury

ATTORNEYS

United States Patent Office 3,245,690 Patented Apr. 12, 1966

1 2

3,245,690

ADJUSTABLE MULTI-NEEDLE TONE ARM FOR PHONOGRAPH RECORDS

Dorothea M. Weitzner, 8 E. 62nd St., New York, N.Y.

Filed Sept. 18, 1963, Ser. No. 309,611
10 Claims. (Cl. 274—23)

This invention relates to the phonograph art and more particularly concerns a phonograph tone arm for playing multiple track records.

According to the invention, there is provided a tone arm having a plurality of pickup heads. Each of the pickup heads may carry one or more needles. The pickup heads can be moved along the tone arm and can be rotated on the tone arm. When the tone arm is placed over a record having a plurality of concentric bands in each of which is a spiral track, the pickup heads can be located so that two or more bands are simultaneously tracked by two or more pickup heads respectively. The needles carried by each pickup head can have tips of different size and made of different materials to produce different sound effects. Instead of a record having multiple tracks, a plurality of records of different diameters may be stacked on a turntable for simultaneously tracking by a plurality of pickup heads.

It is one object of the invention to provide a phonograph tone arm having a plurality of pickup heads rotatably and slidably mounted thereon.

A further object is to provide a tone arm having pickup heads carrying a plurality of needles for selectively positioning the same on different bands of a multiple band record, the needles having tips of different size and made of different materials.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2:
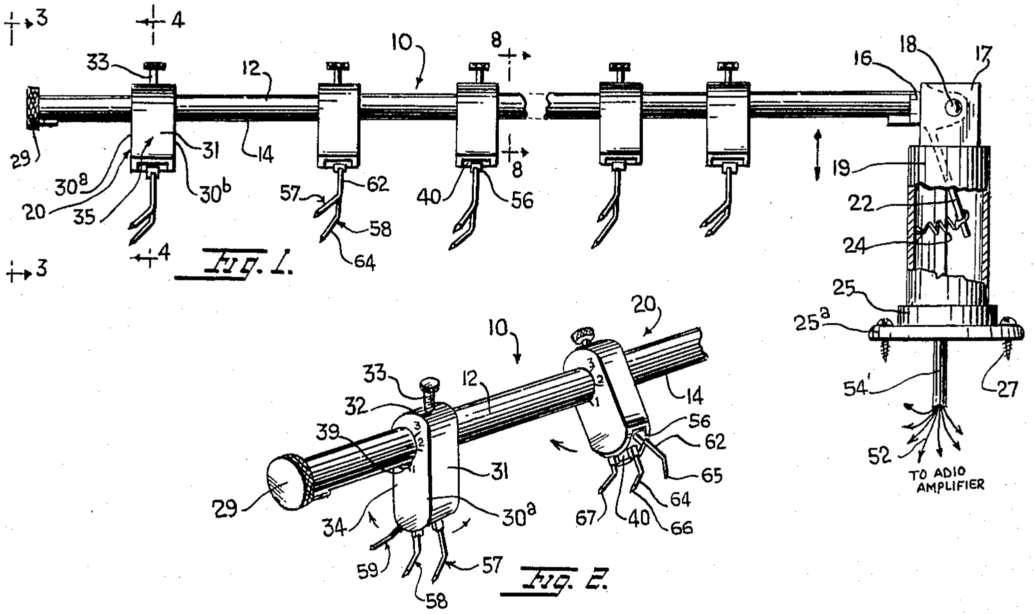
FIG. 1 is a side elevational view of a tone arm embodying the invention, parts being broken away.
FIG. 2 is a fragmentary perspective view of the tone arm.

Referring to FIGS. 1–5 of the drawing, there is shown a tone arm 10 including a light metal cylindrical tube 12. The tube has a cut-away lower portion defining a long slot 14 which extends for substantially the entire length of the tube. The cut-away portion extends circumferentially less than 180° leaving the major portion of the tube to provide a cylindrical support for spaced pickup heads 20. A plurality of these heads are slidable axially of the tube and are also rotatable thereon to a limited angular extent.

At one end of tube 12 is a pair of flat fingers 16 pivotally engaged on a horizontal pin 18 carried by fingers 17 at the upper end of a post 19. An angularly disposed lever arm 22 secured to one of the fingers 16 extends into the post. A coil spring 24 is attached to the bottom end of arm 22 and the inner wall of post 19 so that the tube 12 is supported in a horizontal position and floats as spring 24 expands and contracts; see FIG. 1. Post 19 is rotatably supported in a sleeve 25 having a flange 26 with holes receiving screws 27 for attaching the tone arm to a horizontal phonograph base. Part of the wall of post 19 is broken away in FIG. 1 to show internal parts.

At the free outer end of tube 12 is a removable cap screw 29 which closes the open end of the tube and retains the heads on the tube.

Each of the heads 20 includes a hollow casing 35 with opposing front and rear walls 30$^a$, 30$^b$, and opposing side walls 31. The upper end of the casing has a hole 32 in which is engaged a screw 33. The screw 33 can be screwed into the casing to engage the outer wall of tube 12 to hold the head fixed in any desired position of rotation on the tube and in any desired position axially of the tube. Tube 12 passes through aligned holes 39 in walls 30$^a$, 30$^b$. On the front wall 30 are angularly spaced index lines 34 numbered "1," "2" and "3" to indicate three predetermined angular positions of rotation of the head with respect to one edge of slot 14.

Figure 6:
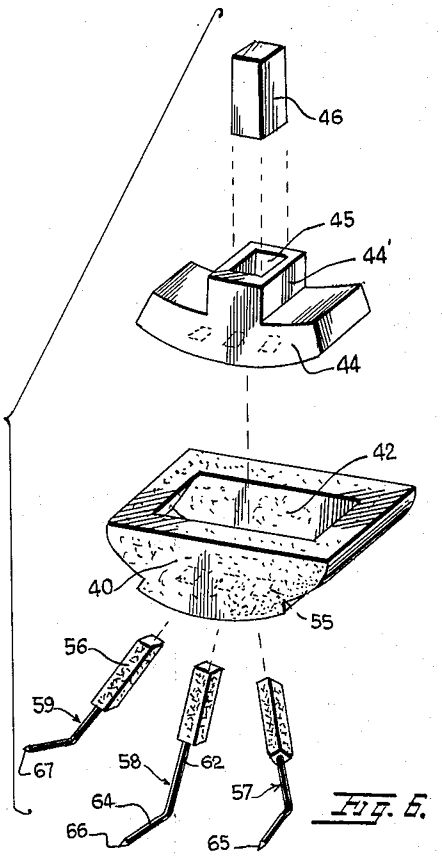
FIG. 6 is an exploded perspective view of components of a pickup head.

Casing 35 has a rectangular bottom opening 37 with inturned side lips 38. In this opening engages the bottom of a soft sponge rubber cushion 40; see FIGS. 4 and 6. The cushion has a generally rectangular recess 42 at its upper side in which fits plastic plug 44. The plug has a central upwardly extending boss 44' in which is a recess 45. The lower end of piezoelectric rod or bar 46 fits in recess 45. On the top of rod or bar 46 is a plastic cap 48 seated in recesses 47 and held by screw 48' in wall 30$^b$. Two metal electrodes 50$^a$, 50$^b$ are disposed inside the cap and make contact with opposite sides of bar 46. Wires 52 of two leads 54 are connected to the electrodes for conducting electrical pulses away from the piezoelectric bar as the bar is flexed during operation of the pickup head. Recesses 47 are formed in inner opposing sides of casing walls 30$^a$, 30$^b$.

At the bottom of cushion 40 are three rectangular holes 55 through which extend rectangular ends 56 of phonograph needles 57, 58 or 59. The sides of rectangular ends 56 may be roughened or knurled to frictionally engage in recesses 60 formed in the bottom of plug 44. The soft rubber cushion 40 helps to hold the needles in place in the plug. The needles are removable by pulling them out axially of the recesses 60. The plug serves as a coupling member between bar 46 and the needles.

Figure 3:
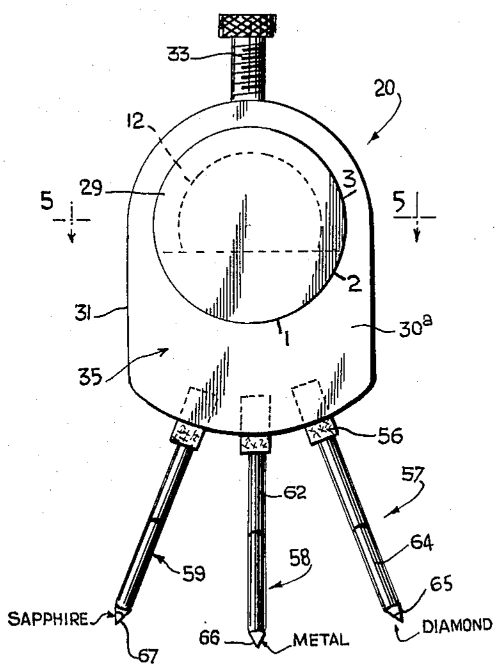
FIG. 3 is an end elevational view on an enlarged scale taken on line 3—3 of FIG. 1.
Figure 4:
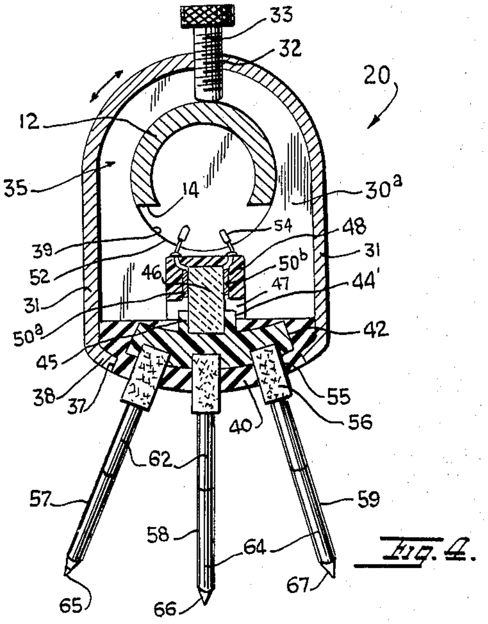
FIG. 4 and FIG. 8 are sectional views on an enlarged scale taken on lines 4—4 and 8—8, respectively, of FIG. 1.
Figure 7:
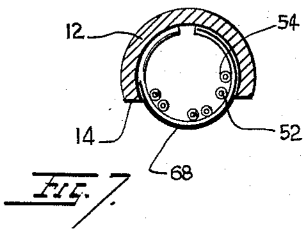
FIG. 7 is an enlarged side view of a phonograph needle.

Each needle 57, 58 or 59, as clearly shown in FIGS. 3, 4 and 7, has a cylindrical shank 62 axially aligned with the rectangular end 56. The shank has a forwardly bent portion 64 with a pointed tip 65, 66 or 67. The tips of the several needles may be made of different materials and may be of different sizes. For example, tip 65 may be a sapphire; tip 66 may be made of metal; and tip 67 may be made of diamond. The tips are generally conical in form and may have different diameters at their bases to define different apical angles. Other materials such as fibers, metal alloys, plastics, etc., may be used as needle tips. The different materials will provide different acoustic effects by modifying the sounds which they pick up differently. Also the tips of different sizes may be used for tracking record grooves of different widths.

Figure 5:
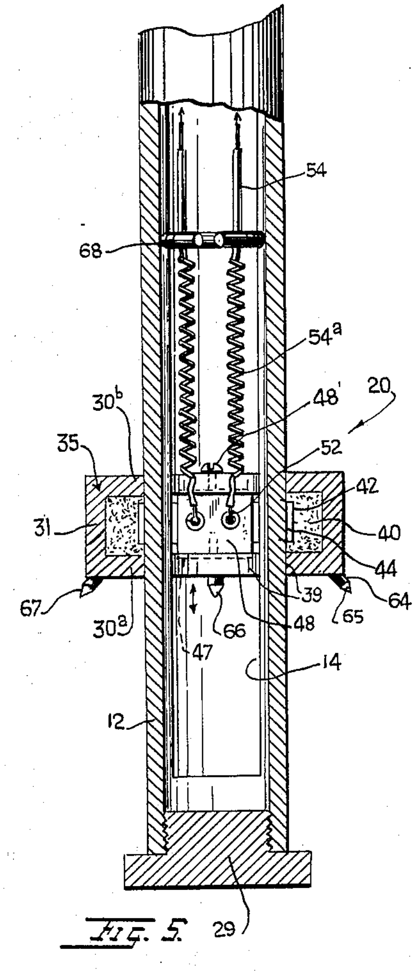
FIG. 5 is a fragmentary longitudinal sectional view taken on line 5—5 of FIG. 3.
Figure 8:
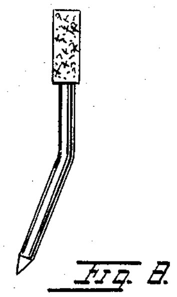

Each of the leads 54 extending away from a head has a coiled springy section 54$^a$; see FIG. 5. This section can be expanded and contracted as the head is adjustably positioned along the tube 12. At the end of the coiled sections is a spring ring 68 which holds the leads 54 in the tube; see FIGS. 5 and 8. A plurality of such rings are provided, one near each of the heads 20 on the tube 12.

Since the heads 20 are rotatably adjustable on the tube 12, any one of the needles can be located so that its shank is disposed in a vertical plane. By aligning the index line 34 corresponding to a selected needle with the adjacent edge of slot 14, the needle will be properly positioned to track a record.

When a head 20 is assembled as shown in FIGS. 4 and 5, any needle which contacts a groove in a photograph record will be caused to vibrate laterally. This will cause a rocking movement from side to side of the plug 44 seated in cushion 54. The cushion serves to dampen free, excessive undesired vibrations of the plug and needles, so that the plug only moves in response to movement of an actuating needle while tracking a record groove. The piezoelectric rod or bar 46 will bend as the plug is rocked to produce varying electrical voltages at the electrodes. Varying electric currents are conducted away from the pickup head via wires 52. The several leads 54 are joined into a single cable 54' at the post 19 and pass downwardly through the post as shown in FIG. 1. Wires 52 terminate at a suitable audio amplifier.

Figure 9:
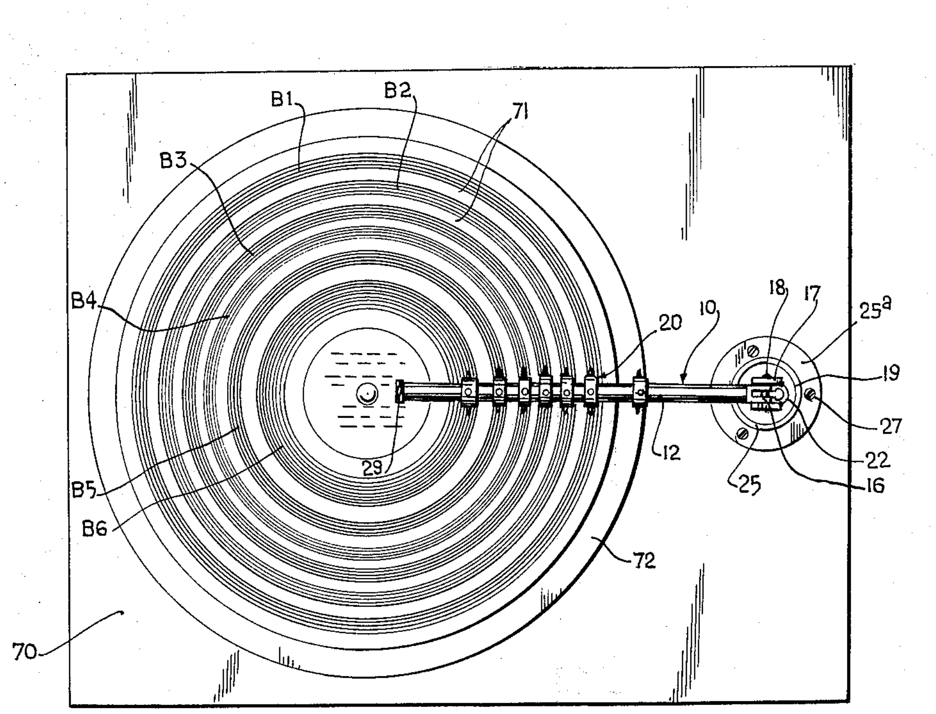
FIG. 9 is a top plan view of an tone arm and multiple band record on a turntable.

FIG. 9 shows a flat phonograph base 70 on which tone arm 10 is mounted. The tone arm tube 12 extends horizontally over circular turntable 72 on which is a disk record 74. This record has a plurality of concentric bands B1–B6 in each of which is a spiral groove. The bands are separated by smooth annular ungrooved bands 71. The tracks of any of bands B1–B6 can be tracked by needles of two or more heads 20, respectively. Thus, if one band has recorded speech while another band has recorded music, the composite reproduced recording will be speech accompanied by music. Different music recordings on several grooved bands may be reproduced by tracking several bands simultaneously. The several heads will be adjusted along the tube 12 to select the desired bands to be tracked.

Figure 10:
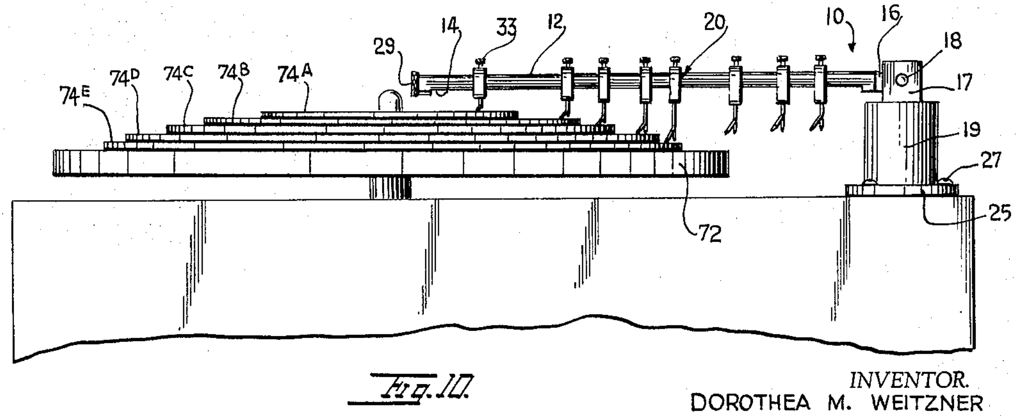
FIGURE 10 is a side view of a tone arm and stack of records on a turntable.

Instead of a single record having multiple bands, there may be provided a plurality of records 74A–74E disposed in a stack on turntable 72 as shown in FIG. 10. The records have progressively larger diameters from top to bottom of the stack. One or more heads 20 on tube 12 can be used to track one or more of the exposed grooves of the records simultaneously.

The invention thus makes it possible to reproduce simultaneously a plurality of recordings from a single record or from a plurality of stacked records. The recordings can be differently modified acoustically by using needles having tips made of different materials or having different shapes. If the stacked records have tracks of different sizes, the multiple head assembly of the tone arm 10 can readily be adjusted to follow these tracks with utmost fidelity since needles of different sizes and materials can be selected for use.

The heads are so arranged that the needles can readily be replaced when worn, or they can readily be interchanged in position. Unused heads can be moved out of the way of the record toward the tone arm.

If desired, the records 74 and 74ª can be made of translucent or transparent materials to present various decorative designs applied to the undersides of the records.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A phonograph tone arm for a record having multiple concentric grooved bands, comprising a cylindrical tube, means located at one end of the tube for supporting the tube in a horizontal position over a turntable carrying a multiple band record, a plurality of pickup heads mounted slidably and rotatably on said tube, means for fixing the heads in selected spaced positions axially along the tube and in selected angular positions with respect to the turntable, a piezoelectric member in each head, wires electrically connected to each piezoelectric member, said tube having a slot formed longitudinally therein with said wires extending into the tube through said slot and axially along the tube to said one end thereof, a coupling member in each head engaged on said piezoelectric member, and a plurality of needles engaged at one end in said coupling member and extending outwardly and downwardly therefrom at angular positions to each other, each of said needles having a pointed tip for engaging in a groove of one of the bands on said record.

2. A phonograph tone arm for a record having multiple concentric grooved bands, comprising a cylindrical tube, means located at one end of the tube for supporting the tube in a horizontal position over a turntable carrying a multiple band record, a plurality of pickup heads mounted slidably and rotatably on said tube, means for fixing the heads in selected spaced positions axially along the tube and in selected angular positions with respect to the turntable, a piezoelectric member in each head, wires electrically connected to each piezoelectric member, said tube having a slot formed longitudinally therein with said wires extending into the tube through said slot and axially along the tube to said one end thereof, and a coupling member in each head engaged on said piezoelectric member for supporting needles to track the grooves of said multiple band record.

3. A phonograph tone arm for a record having multiple concentric grooved bands, comprising a cylindrical tube, means located at one end of the tube for supporting the tube in a horizontal position over a turntable carrying a multiple band record, a plurality of pickup heads mounted slidably and rotatably on said tube, means for fixing the heads in selected spaced positions axially along the tube and in selected angular positions with respect to the turntable, each of said heads comprising a hollow casing having parallel front and rear walls with aligned openings, said tube passing through said openings, a hollow cap engaged in a fixed position between said walls, a piezoelectric member having one end engaged in said cap, a coupling member on the other end of said piezoelectric member for supporting a needle, said tube having a slot formed longitudinally therein, and wires electrically connected to said piezoelectric member through said cap, said wires extending into the tube through said slot and axially along the tube to said one end thereof, said wires having coiled portions to permit the heads to be adjustably positioned axially of the tube and angularly around the tube.

4. A phonograph tone arm for a record having multiple concentric grooved bands, comprising a cylindrical tube, means located at one end of the tube for supporting the tube in a horizontal position over a turntable carrying a multiple band record, a plurality of pickup heads mounted slidably and rotatably on said tube, means for fixing the heads in selected spaced positions axially along the tube and in selected angular positions with respect to the turntable, each of said heads comprising a hollow casing having parallel front and rear walls with aligned openings, said tube passing through said openings, a hollow cap engaged in a fixed position between said walls, a piezoelectric member having one end engaged in said cap, a soft, resilient cushion seated in the casing and exposed at one end thereof, and a coupling member on the other end of said piezoelectric member for supporting a needle, said tube having a slot formed longitudinally therein for passing wires from said head to said one end of the tube.

5. A phonograph tone arm for a record having multiple concentric grooved bands, comprising a cylindrical tube, means located at one end of the tube for supporting the tube in a horizontal position over a turntable carrying a multiple band record, a plurality of pickup heads mounted slidably and rotatably on said tube, means for fixing the heads in selected spaced positions axially along the tube and in selected angular positions with respect to the turntable, each of said heads comprising a hollow casing having parallel front and rear walls with aligned openings, said tube passing through said openings, a hollow cap engaged in a fixed position between said walls, a piezoelectric member having one end engaged in said cap, a soft, resilient cushion seated in the casing and exposed at one end thereof, a coupling member on the other end of said piezoelectric member, and a plurality of needles engaged at one end in said piezoelectric member and passing through said cushion, said needles extending outwardly and downwardly from the cushion at angular positions to each other for selectively tracking one of said bands depending on the angular position of the head on the tube with respect to the record.

6. A phonograph tone arm for a record having multiple concentric grooved bands, comprising a cylindrical tube, means located at one end of the tube for supporting the tube in a horizontal position over a turntable carrying a multiple band record, a plurality of pickup heads mounted slidably and rotatably on said tube, means for fixing the heads in selected spaced positions axially along the tube and in selected angular positions with respect to the turntable, each of said heads comprising a hollow casing having parallel front and rear walls with aligned openings, said tube passing through said openings, a hollow cap engaged in a fixed position between said walls, a piezoelectric member having one end engaged in said cap, a soft, resilient cushion seated in the casing and exposed at one end thereof, and a coupling member having a recessed portion on the other end of said piezoelectric member, said coupling member having other recessed portions for receiving ends of a plurality of needles and for supporting the same in outwardly extending positions angularly to each other.

7. A pickup head for a tone arm having an elongated hollow horizontal tube pivotally supported on a phonograph base, comprising a hollow casing having parallel front and rear walls with aligned openings for passing said tube therethrough to mount the casing slidably and rotatably on the tube, a screw at one end of the casing extending into the casing for engaging on the tube to hold the casing fixed in position on the tube, a hollow plastic cap engaged in a fixed position between said walls, a piezoelectric member having one end engaged in said cap, a soft resilient cushion seated in the casing and exposed at the other end thereof, and a coupling member on the other end of said piezoelectric member seated on the cushion for supporting a needle to track a groove in a record.

8. A pickup head for a tone arm having an elongated hollow horizontal tube pivotally supported on a phonograph base, comprising a hollow casing having parallel front and rear walls with aligned openings for passing said tube therethrough to mount the casing slidably and rotatably on the tube, a screw at one end of the casing extending into the casing for engaging on the tube to hold the casing fixed in position on the tube, a hollow plastic cap engaged in a fixed position between said walls, a piezoelectric member having one end engaged in said cap, a soft resilient cushion seated in the casing and exposed at the other end thereof, a coupling member on the other end of said piezoelectric member seated on the cushion, said coupling member having a plurality of angularly disposed recesses, and a plurality of needles having shanks with noncircular ends engaged in said recesses, said needles extending outwardly and downwardly from the coupling member through said cushion and at angular positions to each other for selectively tracking a groove in a record depending on the angular position of said casing on said tube.

9. A phonograph tone arm for a record having multiple concentric grooved bands, comprising a cylindrical tube, means located at one end of the tube for supporting the tube in a horizontal position over a turntable carrying a multiple band record, a plurality of pickup heads mounted slidably and rotatably on said tube, means for fixing the heads in selected spaced positions axially along the tube and in selected angular positions with respect to the turntable, each of said heads comprising a hollow casing having parallel front and rear walls with aligned openings, said tube passing through said openings, a piezoelectric bar supported at one end in the casing, and a coupling member on the other end of said bar for supporting a needle.

10. A phonograph tone arm for a record having multiple concentric grooved bands, comprising a cylindrical tube, means located at one end of the tube for supporting the tube in a horizontal position over a turntable carrying a multiple band record, a plurality of pickup heads mounted slidably and rotatably on said tube, means for fixing the heads in selected spaced positions axially along the tube and in selected angular positions with respect to the turntable, each of said heads comprising a hollow casing having parallel front and rear walls with aligned openings, said tube passing through said openings, a piezoelectric bar supported at one end in the casing, a coupling member on the other end of said bar, a resilient cushion seated in said coupling member, and a plurality of needles engaged in said coupling member and passing through said cushion out of the casing, whereby said cushion attenuates undesired vibrations of the coupling member and needles, said needles being disposed in angular positions with respect to each other for selectively tracking a groove in a record depending on the angular position of said head on said tube.

References Cited by the Examiner

UNITED STATES PATENTS

| | | | |
|---|---|---|---|
| 1,752,357 | 4/1930 | Wiener | 274—13 |
| 2,930,624 | 3/1960 | Banholzer | 274—23 X |
| 2,988,366 | 6/1961 | Hansen | 274—36 |
| 3,051,495 | 8/1962 | Wittenberg | 274—36 X |

NORTON ANSHER, *Primary Examiner.*

EVON C. BLUNK, *Examiner.*